(12) United States Patent
Gabbey et al.

(10) Patent No.: US 12,172,468 B2
(45) Date of Patent: Dec. 24, 2024

(54) ADJUSTABLE WHEEL ASSEMBLY

(71) Applicant: Snap-on Incorporated, Kenosha, WI (US)

(72) Inventors: Nicholas A. Gabbey, Mount Pleasant, WI (US); George R.R. Call, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/114,215

(22) Filed: Feb. 24, 2023

(65) Prior Publication Data

US 2024/0286435 A1 Aug. 29, 2024

(51) Int. Cl.
  *B60B 33/06* (2006.01)
  *B60B 33/04* (2006.01)

(52) U.S. Cl.
  CPC .................. *B60B 33/04* (2013.01)

(58) Field of Classification Search
  CPC ....... B60B 33/04; B60B 33/06; B60B 33/063; B60B 2200/20; B43L 1/00; B43L 1/02; B43L 1/04
  See application file for complete search history.

(56) References Cited

U.S. PATENT DOCUMENTS

| | | | |
|---|---|---|---|
| 813,438 A * | 2/1906 | Landis | B60B 33/06 16/34 |
| 1,136,915 A | 4/1915 | Adams | |
| 1,375,536 A | 4/1921 | Ostrander | |
| 1,482,953 A | 5/1924 | Tideman | |
| 1,835,144 A * | 12/1931 | Cleaveland | B60B 33/04 16/34 |
| 2,386,005 A * | 10/1945 | Raup | B60B 33/045 16/34 |
| 2,663,048 A * | 12/1953 | Ross, Jr. | B60B 33/06 16/34 |
| 2,874,971 A | 2/1959 | Devery | |
| 3,040,391 A * | 6/1962 | Saunders | B60B 33/06 16/99 |

(Continued)

FOREIGN PATENT DOCUMENTS

| | | |
|---|---|---|
| AU | 2021211994 | 3/2020 |
| DE | 2705958 A1 * | 8/1978 |

(Continued)

*Primary Examiner* — Chuck Y Mah
(74) *Attorney, Agent, or Firm* — McDonnell Boehnen Hulbert & Berghoff LLP (57) ABSTRACT

A tool storage unit includes a housing configured to store a tool. The tool storage unit additionally includes an adjustable wheel assembly coupled to the housing. The adjustable wheel assembly includes a bolt movable between a first position and a second position, a support arm extending outwardly from the housing, a swing arm, and a caster wheel. The swing arm defining a first end and a second end, where the first end receives the bolt and is pivotally coupled to the support arm and the second end is rotatably coupled to the caster wheel. The swing arm is vertically movable between a raised position and a lowered position, where the caster wheel and swing arm are in the raised position when the bolt is in the first position and the caster wheel and swing arm are in the lowered position when the bolt is in the second position.

19 Claims, 10 Drawing Sheets

(56) References Cited

U.S. PATENT DOCUMENTS

| | | | |
|---|---|---|---|
| 3,041,656 A * | 7/1962 | Goodall | B60B 33/045 |
| | | | 267/281 |
| 3,534,430 A | 10/1970 | Kesling et al. | |
| 3,656,203 A * | 4/1972 | Waflart, Jr. | B60B 33/0089 |
| | | | 16/35 R |
| 4,518,142 A | 5/1985 | Sulcek et al. | |
| 4,763,868 A | 8/1988 | Teich | |
| 4,955,569 A | 9/1990 | Hottmann | |
| 5,580,137 A * | 12/1996 | Doan | B25H 1/04 |
| | | | 52/630 |
| 5,944,291 A | 8/1999 | Kato et al. | |
| 5,971,408 A | 10/1999 | Mandel et al. | |
| 6,279,199 B1 * | 8/2001 | Plate | B60B 33/045 |
| | | | 16/34 |
| 6,539,578 B1 * | 4/2003 | Guttmann | G01G 19/52 |
| | | | 16/44 |
| 6,601,806 B2 | 8/2003 | Wing et al. | |
| 6,871,379 B2 | 3/2005 | Ebeling et al. | |
| 6,904,641 B2 | 6/2005 | Magoto et al. | |
| 6,920,656 B2 * | 7/2005 | Roussy | A61G 7/0528 |
| | | | 16/19 |
| 8,469,375 B2 | 6/2013 | Frens | |
| 8,499,414 B1 * | 8/2013 | LeMeur, Jr. | B60B 33/045 |
| | | | 16/24 |
| 8,544,861 B2 | 10/2013 | Frens | |
| 8,657,306 B2 | 2/2014 | Chiu | |
| 8,914,943 B2 | 12/2014 | Grassia | |
| 9,463,122 B2 | 10/2016 | Pirone et al. | |
| 9,586,442 B2 | 3/2017 | Trickle | |
| 9,821,603 B2 | 11/2017 | Trickle | |
| 10,780,739 B2 | 9/2020 | McKay et al. | |
| 11,298,978 B2 | 4/2022 | McKay et al. | |
| 11,712,924 B2 * | 8/2023 | Peterson | B60B 33/0068 |
| | | | 16/19 |
| 2004/0055108 A1 * | 3/2004 | Lemeur, Jr. | B60B 33/045 |
| | | | 16/44 |
| 2004/0181901 A1 * | 9/2004 | Magoto | B60B 33/04 |
| | | | 16/19 |
| 2010/0038517 A1 * | 2/2010 | Home | B60B 33/06 |
| | | | 126/304 R |
| 2014/0109341 A1 * | 4/2014 | Plate | B60B 33/045 |
| | | | 16/19 |
| 2022/0234386 A1 | 7/2022 | McKay et al. | |

FOREIGN PATENT DOCUMENTS

| | | |
|---|---|---|
| EP | 1907225 A1 | 4/2008 |
| EP | 3990291 A1 | 5/2022 |
| JP | 2008081059 A * | 4/2008 |

* cited by examiner

ADJUSTABLE WHEEL ASSEMBLY

BACKGROUND

Casters are mounted on a variety of objects, such as tool storage units. Casters can be constrained in a fixed position to follow a straight path of travel along a floor, and others can be mounted on a pivot to allow unconstrained travel along a floor. When objects having casters are on an unlevel floor, such as a floor surface graded to allow fluids to drain, the object can sit unlevel and result in undesired rolling of the object. Wooden blocks or other heavy objects are often used to chock caster wheels to prevent undesired rolling. However, the wooden blocks or other heavy objects require additional material and do not travel with the tool storage unit when moved. Further, such chocks can trap material, such as chemical fluids, and impede proper draining of a floor surface, which may pose a health and safety risk to people working in the area.

OVERVIEW

In a first implementation, a tool storage unit is provided. The tool storage unit includes a housing configured to store a tool, the housing having both a first side and a second side opposite the first side, the second side defining an underside. The tool storage unit also includes an adjustable wheel assembly coupled to the housing. The adjustable wheel assembly includes a bolt movable between a first position and a second position. The adjustable wheel assembly also includes a support arm, connected to the underside of the second side of the housing, extending outwardly from the housing and defining a plurality of apertures, where at least one of the plurality of apertures is a point of rotation and at least one of the plurality of apertures is configured to receive the bolt. The adjustable wheel assembly further includes a caster wheel. The adjustable wheel assembly additionally includes a swing arm defining a first end, a second end, and a plurality of apertures, where the first end receives the bolt in at least one of the apertures and is pivotally coupled to the support arm and the second end is rotatably coupled to the caster wheel. The swing arm being vertically movable between a raised position and a lowered position relative to the underside of the second side, where the caster wheel and swing arm are in the raised position when the bolt is in the first position and the caster wheel and swing arm are in the lowered position when the bolt is in the second position.

In an embodiment of the tool storage unit, the tool storage unit further includes a non-adjustable wheel assembly coupled to the housing.

In an embodiment of the tool storage unit, the bolt is an eccentric bolt.

In an embodiment of the tool storage unit, the bolt is a cam bolt.

In an embodiment of the tool storage unit, a fixed bolt pivotally couples the swing arm to the support arm at the point of rotation and the aperture configured to receive the bolt is distinct from the point of rotation.

In such embodiments of the tool storage unit, an eccentric bolt or a cam bolt couples the swing arm to the support arm at the aperture configured to receive the bolt.

In an embodiment of the tool storage unit, an eccentric bolt or a cam bolt rotatably couples the second end of the swing arm to the caster wheel.

In an embodiment of the tool storage unit, the support arm is a first support arm and the adjustable wheel assembly further includes a second support arm symmetrical to the first support arm and disposed at a distance from the first support arm such that the swing arm and the caster wheel are disposed between the first and second support arms.

In such embodiments of the tool storage unit, the swing arm is a first swing arm coupled to the first support arm and the adjustable wheel assembly further includes a second swing arm symmetrical to the first swing arm and coupled to the second support arm, where the caster wheel is disposed between and rotatably coupled to the first and second swing arm.

In a second implementation, an adjustable wheel assembly is provided. The adjustable wheel assembly includes a bolt movable between a first position and a second position. The adjustable wheel assembly also includes a support bracket comprising a support arm that defines a plurality of apertures, where at least one of the plurality of apertures is a point of rotation and at least one of the plurality of apertures is configured to receive the bolt. The adjustable wheel assembly further includes a caster wheel. The adjustable wheel assembly additionally includes a swing arm defining a first end, a second end, and a plurality of apertures, where the first end receives the bolt in at least one of the apertures and is pivotally coupled to the support arm and the second end is rotatably coupled to the caster wheel. The swing arm being vertically movable between an extended position and an unextended position relative to the support bracket, where the caster wheel and swing arm are in the extended position when the bolt is in the first position and the caster wheel and swing arm are in the unextended position when the bolt is in the second position.

In an embodiment of the adjustable wheel assembly, the bolt is an eccentric bolt.

In such embodiments of the adjustable wheel assembly, the eccentric bolt comprises an eccentric fastener coupled to at least one eccentric cam.

In an embodiment of the adjustable wheel assembly, the bolt is a cam bolt.

In an embodiment of the adjustable wheel assembly, a fixed bolt pivotally couples the swing arm to the support arm at the point of rotation and the aperture configured to receive the bolt is distinct from the point of rotation.

In such embodiments of the adjustable wheel assembly, an eccentric bolt or a cam bolt couples the swing arm to the support arm at the aperture configured to receive the bolt.

In an embodiment of the adjustable wheel assembly, an eccentric bolt or a cam bolt rotatably couples the second end of the swing arm to the caster wheel.

In an embodiment of the adjustable wheel assembly, the support arm is a first support arm and the support bracket further includes a second support arm symmetrical to the first support arm and disposed at a distance from the first support arm such that the swing arm and the caster wheel are disposed between the first and second support arms.

In such embodiments of the adjustable wheel assembly, the swing arm is a first swing arm coupled to the first support arm and the adjustable wheel assembly further includes a second swing arm symmetrical to the first swing arm and coupled to the second support arm, where the caster wheel is disposed between and rotatably coupled to the first and second swing arm.

In a third implementation, a tool storage unit is provided. The tool storage unit includes a housing configured to store a tool, the housing having both a first side and a second side opposite the first side, the second side defining an underside. The tool storage unit also includes an adjustable wheel assembly coupled to the housing. The adjustable wheel assembly includes a bolt movable between a first position and a second position. The adjustable wheel assembly also includes a support arm, connected to the underside of the second side of the housing, extending outwardly from the housing. The adjustable wheel assembly further includes a caster wheel. The adjustable wheel assembly additionally includes a swing arm defining a first end and a second end, where the first end is coupled to the support arm and the second end is rotatably coupled to the caster wheel by the bolt. The caster wheel being vertically movable between a raised position and a lowered position relative to the underside of the second side, where the caster wheel is in the raised position when the bolt is in the first position and the caster wheel is in the lowered position when the bolt is in the second position.

In a fourth implementation, a method of adjusting the height of a tool storage unit having an adjustable wheel assembly is provided. The method includes loosening a nut securing a bolt on the adjustable wheel assembly, where the bolt is in a first position and movable between the first position and a second position, and where the adjustable wheel assembly is in a raised position when the bolt is in the first position. The method also includes rotating the bolt from the first position to the second position, where the adjustable wheel assembly is in a lowered position when the bolt is in the second position. The method further includes tightening the nut to secure the bolt in the second position via clamp up load.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

The drawings are schematic and not necessarily to scale. In the drawings, similar symbols typically identify similar components, unless context dictates otherwise.

DETAILED DESCRIPTION

This description describes several example embodiments, at least some which relate to adjustable wheel assemblies. In example embodiments, the adjustable wheel assembly may include a bolt movable between a first position and a second position. Movement of the bolt from the first position to the second position may cause components of the adjustable wheel assembly to move from an extended position and an unextended position relative to other components. Such adjustment of position of the adjustable wheel assembly may allow leveling of an object coupled to the adjustable wheel assembly without the aid of shims. Leveling of the object may reduce undesired and/or uncontrolled movement of the object across a sloped floor without the aid of chocks.

In examples of the present disclosure, a tool storage unit including an adjustable wheel assembly is disclosed. More particularly, the tool storage unit may include a housing configured to store a tool and an adjustable wheel assembly coupled to the housing. The adjustable wheel assembly may include a bolt movable between a first position and a second position. The adjustable wheel assembly may also include a support arm that couples to and extends outwardly from the housing. The support arm may define a plurality of apertures, where at least one of the apertures may form point of rotation and at least one of the plurality of apertures may receive the bolt. The adjustable wheel assembly may additionally include a swing arm that couples with the support arm via the bolt and also rotatably couples to a caster wheel. The swing arm may be vertically movable between a raised position and a lowered position relative to the housing, where the caster wheel and swing arm may be in the raised position when the bolt is in the first position and the caster wheel and swing arm may be in the lowered position when the bolt is in the second position. Thus, the adjustable wheel assembly may provide for an integrated leveling system on the tool storage unit.

Figure 1:
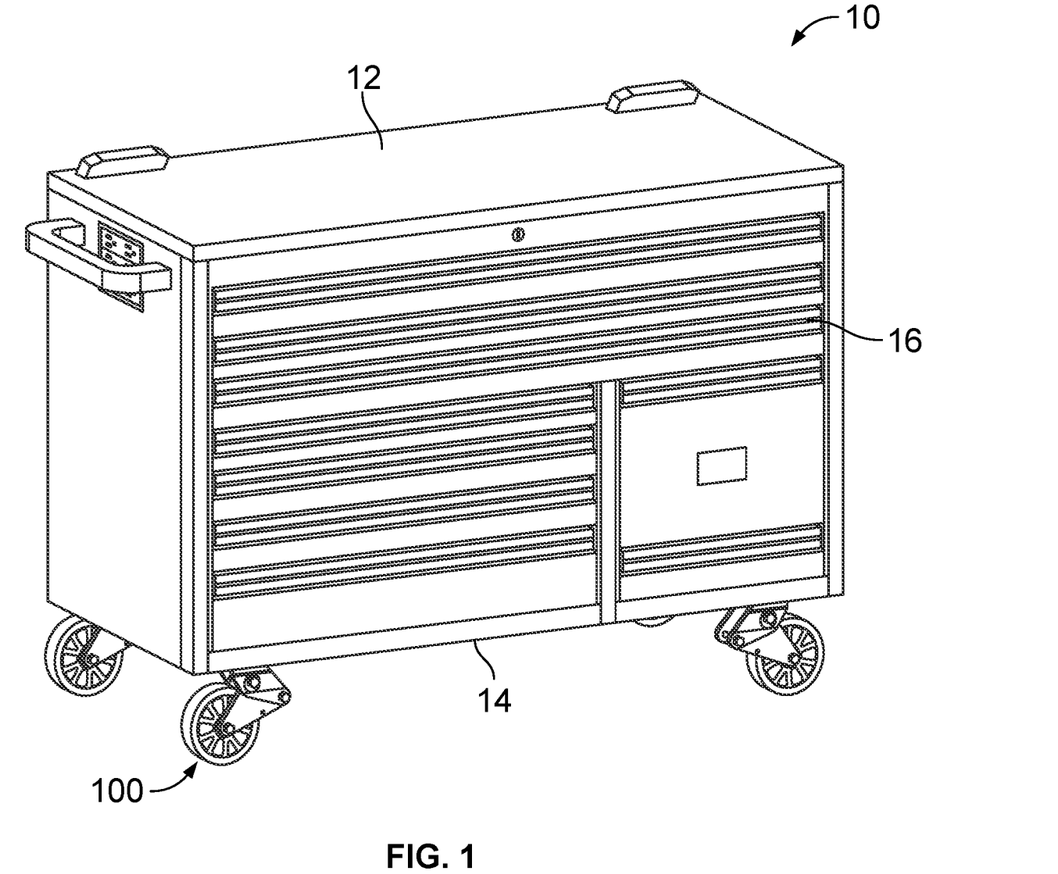
FIG. 1 illustrates a tool storage unit including an adjustable wheel assembly, according to an example embodiment.

FIG. 1 depicts a tool storage unit 10 with a housing 16. The housing 16 may include one or more parts of the tool storage unit 10 (e.g., drawers, cabinets), various enclosures, among other examples. The tool storage unit 10 may be part of a larger storage device or be a standalone unit. For example, the tool storage unit 10 may include the housing 16. A user may open a drawer or a door of the housing 16. The housing 16 may be used to store various tools and equipment.

In one example, the housing 16 of the tool storage unit 10 includes a first side 12 and a second side 14 opposite the first side, where the second side 14 defines an underside. Various components may be coupled to the housing 16 of the tool storage unit 10. For example, at least one adjustable wheel assembly 100 may be coupled to the underside of the second side 14 of the housing 16.

In another example a non-adjustable wheel assembly is coupled to the housing of the tool storage unit 10. For instance, a tool storage unit 10 may include four wheels, where two of the wheels are adjustable wheel assemblies 100 and two of the wheels are non-adjustable wheel assemblies. However, other numbers and combinations of wheel assemblies are possible. The tool storage unit 10 may thus include a combination of adjustable and non-adjustable wheel assemblies.

The non-adjustable wheel assembly is a wheel assembly having the location of all parts remaining fixed with respect to one another. The position of each component on the non-adjustable wheel assembly is not adjustable. The non-adjustable wheel assembly may include a caster wheel coupled to a supporting structure. A distance between the caster wheel and the underside of the second side 14 of the housing 16 remains fixed and is not adjustable via the components of the non-adjustable wheel assembly.

Figure 2A:
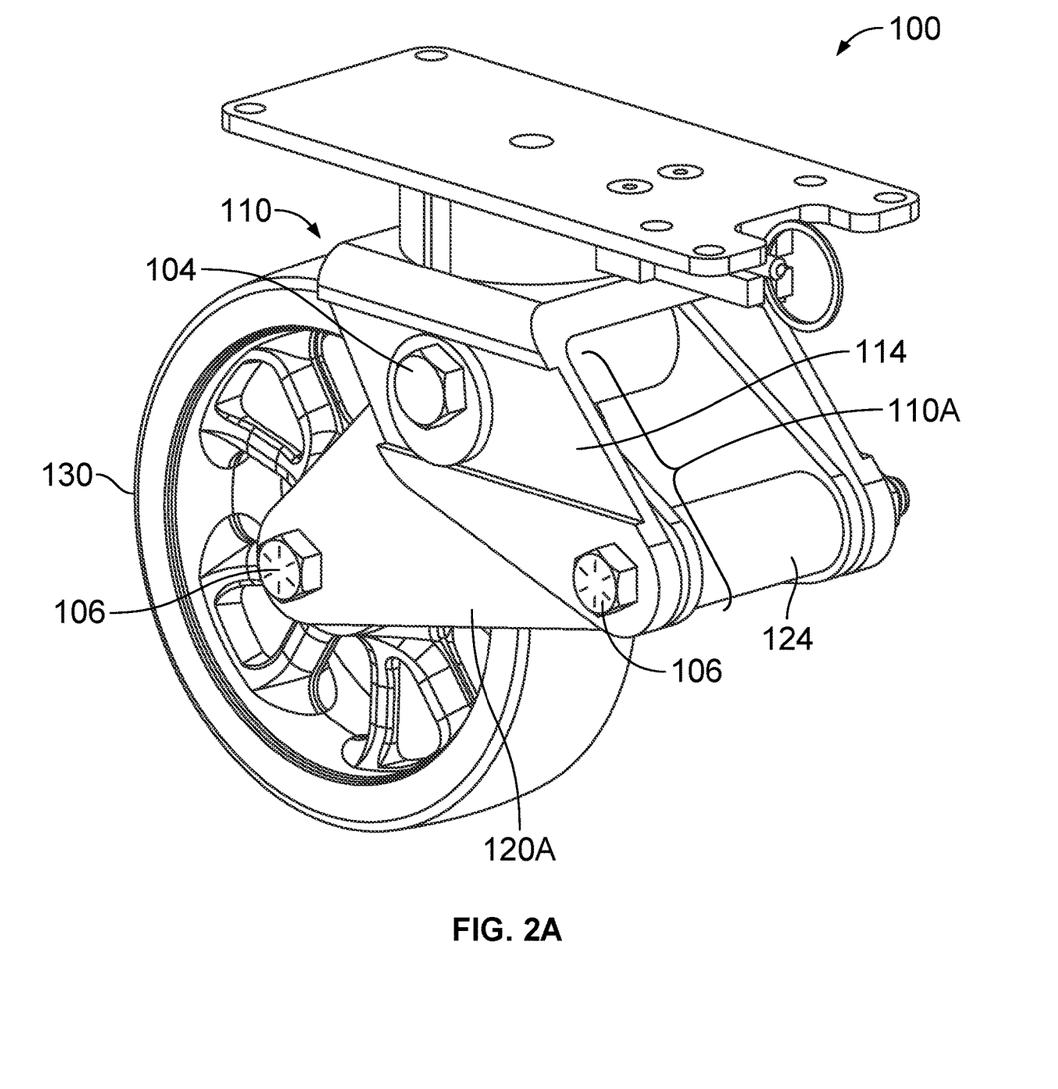
FIG. 2A illustrates a perspective view of an adjustable wheel assembly, according to an example embodiment.
Figure 2B:
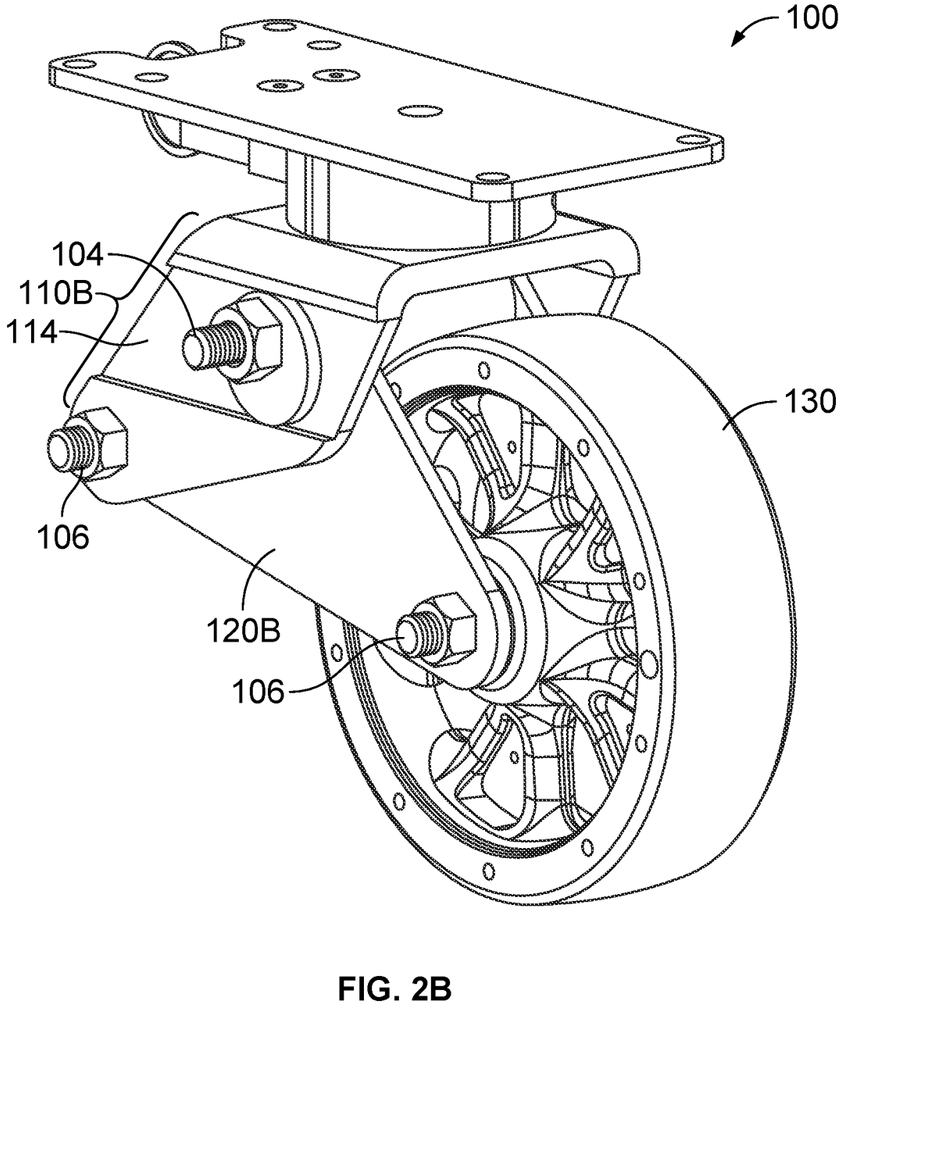
FIG. 2B illustrates a perspective view of an adjustable wheel assembly, according to an example embodiment.
Figure 2C:
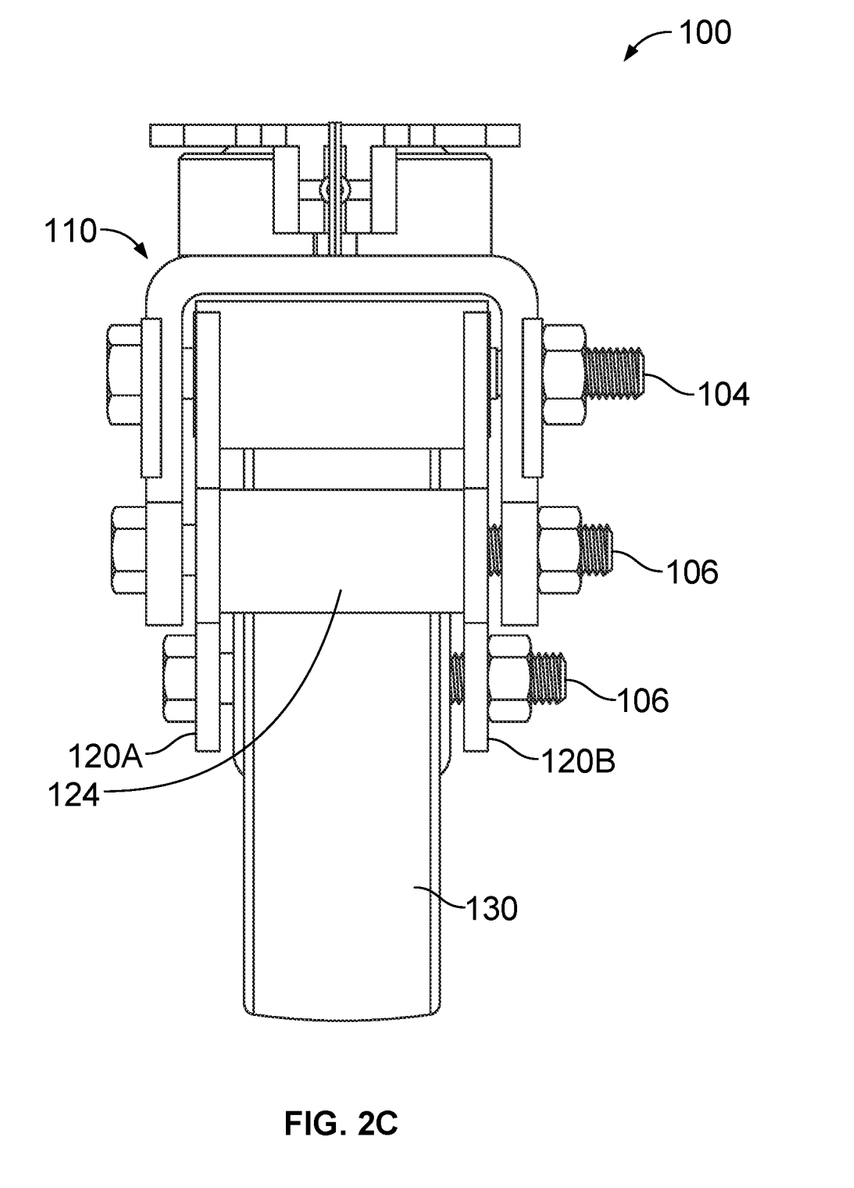
FIG. 2C illustrates a plan view of an adjustable wheel assembly, according to an example embodiment.

FIGS. 2A and 2B illustrate perspective views of an adjustable wheel assembly 100, according to an example embodiment. FIG. 2C illustrates a plan view of the adjustable wheel assembly 100, according to an example embodiment. An example adjustable wheel assembly 100 includes a support bracket 110 that includes a first support arm 110A and a second support arm 110B. The first and second support arms 110A and 110B are coupled, by way of a bolt 104, to a first swing arm 120A and a second swing arm 120B. The first and second swing arms 120A and 120B are rotatably coupled to a caster wheel 130.

The first and second support arms 110A and 110B each define a plurality of apertures that are capable of receiving the bolt 104 and a fastener, such as fastener 106, which further couples the support arms 110A and 110B to the swing arms 120A and 120B and forms a point of rotation. As shown the apertures are occupied by the bolt 104 and/or the fastener 106. The fastener 106 may be a fixed bolt. In some examples, the fixed bolt does not move from a first position to a second position, thus rotation of the fixed bolt does not adjust a position of the caster wheel assembly. The fixed bolt may have a head of the bolt concentric with a shaft and/or shank of the bolt. In some examples, the fixed bolt may be a hex bolt, a machine bolt, a flange bolt, a carriage bolt, an architectural bolt, etc. In other examples, the fastener 106 may be a rivet, a rod, or a bar coupled to a pin, such as a clevis pin coupled to a cotter pin.

The first and second support arms 110A and 110B of the adjustable wheel assembly 100 according to the example embodiment of FIGS. 2A and 2B each includes a channel 114 configured to receive the bolt 104. A width of the channel 114 may be equal to or greater than a dimension of the bolt 104, such as a diameter of an eccentric cam included on the bolt 104. The depth of the channel 114 may be equal to, greater than, or less than a dimension of the bolt 104, for instance a thickness of the eccentric cam included on the bolt 104. The channel 114 may allow the eccentric cam on the bolt 104 to reside completely within the channel 114 such that the eccentric cam may sit flush with a surface of the respective first and second support arms 110A and 110B. Edges of the channel 114 may come into contact with a portion of the bolt 104, such as contacting the eccentric cam, and may assist in keeping the bolt 104 in a desired position by further constraining movement of the bolt 104. The channel may also aid in transferring loading from the bolt 104 through the adjustable wheel assembly 100. In some examples, both the first and second support arms 110A and 110B include the channel 114, while in other examples only one support arm, or no support arms, include the channel 114.

In one example, the adjustable wheel assembly 100 is coupled to the tool storage unit 10. The adjustable wheel assembly 100 may be coupled to the underside of the second side 14 of the housing 16 of the tool storage unit 10. For instance, the first and second support arms 110A and 110B may be coupled to the underside of the second side 14 of the housing 16 of the tool storage unit 10 and extend outwardly from the housing 16.

The adjustable wheel assembly 100 may be made from any suitable material. For example, a metal, such as steel, may be used to construct various components of the adjustable wheel assembly 100. Other metals or materials may also be used. In some examples, more than one material may be used. A coating or treatment may also be applied to the components of the adjustable wheel assembly 100. The coating or treatment may be a corrosion or erosion preventative coating, for example galvanizing; however, other coatings or treatments are also possible.

Figure 3:
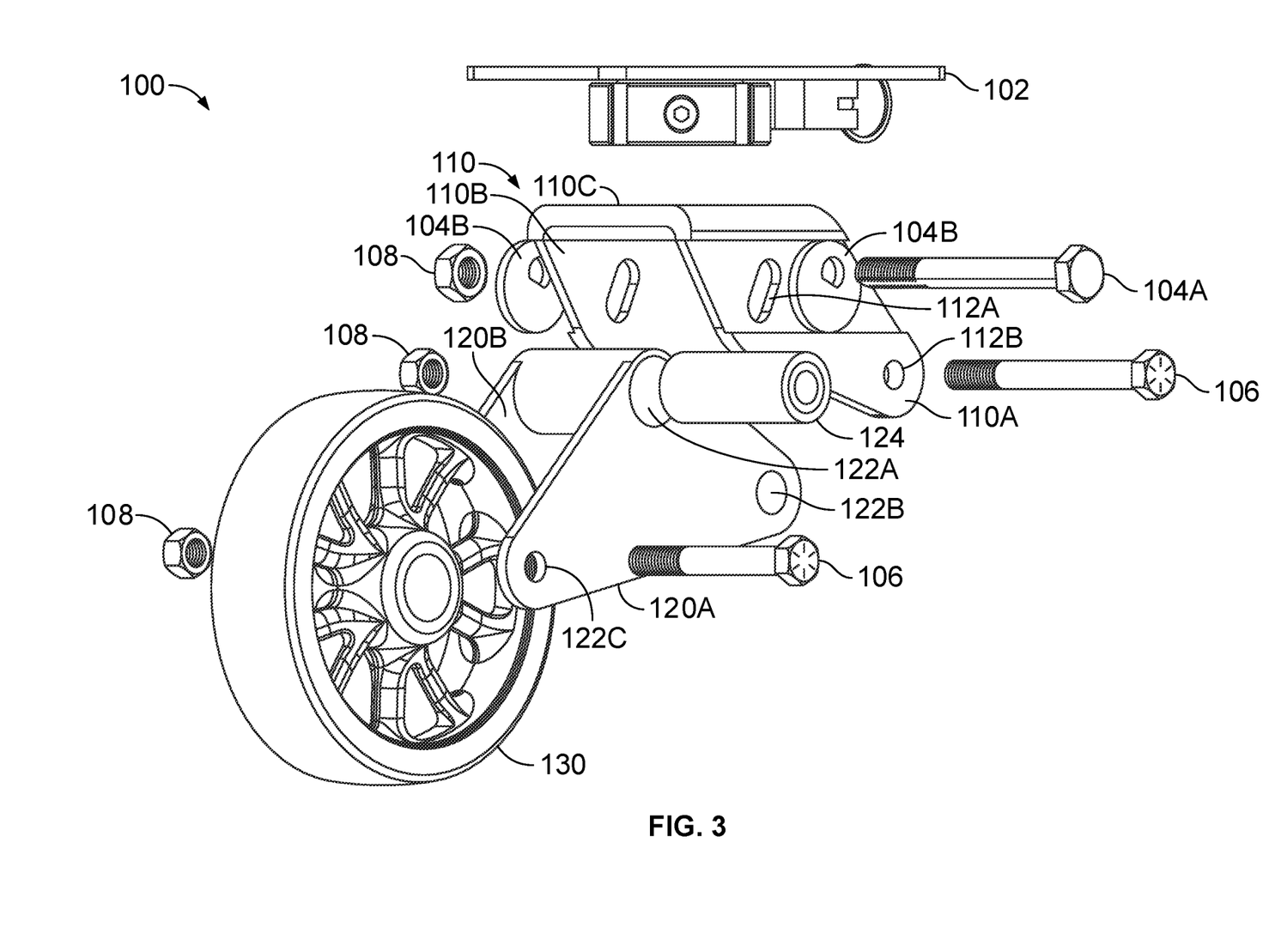
FIG. 3 illustrates an exploded view of the adjustable wheel assembly of FIGS. 2A through 2C, according to an example embodiment.

FIG. 3 shows an exploded view of the adjustable wheel assembly 100 of FIGS. 2A through 2C, according to an example embodiment. As shown, FIG. 3 includes a bearing plate 102, a support bracket 110, first and second swing arms 120A and 120B, and the caster wheel 130.

The bearing plate 102 may be coupled to the tool storage unit 10 and provide further coupling to the support bracket 110. Any suitable form of fastening (e.g., a bolt and a nut) may be used to couple the bearing plate 102 to the tool storage unit 10. The bearing plate 102 may include a bearing coupling between the bearing plate 102 and the support bracket 110, which may enable the adjustable wheel assembly 100 to rotate, pivot, and/or swivel in order to change the direction in which the adjustable wheel assembly 100 is oriented. The bearings may be ball bearings, roller bearings, needle bearings, etc. In this way, as a user moves the tool storage unit 10, including the adjustable wheel assembly 100, around a shop floor, the user may be able to change a direction of travel of the tool storage unit 10 by simply pushing the tool storage unit 10 in a new direction which may cause the adjustable wheel assembly 100 to automatically reorient (e.g., by swiveling via the radial ball bearings) to the new direction of travel. In some examples, the bearing plate 102 may include a device that prevents the adjustable wheel assembly 100 from swiveling (e.g., reorienting the direction the caster wheel faces), such as a lock or locking pin. The bearing plate 102 may be coupled to the support bracket 110.

In the example shown, the support bracket 110 is a single piece that includes a first support arm 110A and a second support arm 110B integrally formed with a top piece 110C. The top piece 110C may allow coupling of the support bracket 110 to the bearing plate 102, with the bearing plate 102 further coupling to the tool storage unit 10. However, in other examples, the support bracket 110 may couple directly to the tool storage unit 10 without the aid of the bearing plate 102. In another example, the first and second support arms 110A and 110B of support bracket 110 are not formed from a single piece (e.g., the first support arm 110A may be a separate piece from the second support arm 110B) and does not include the top piece 110C; in such an example, the first and second support arms 110A and 110B may directly couple to the bearing plate 102 or the tool storage unit 10. Further, the first and second support arms 110A and 110B may be symmetrical to one another.

The first and second support arms 110A and 110B may be separated at a distance from one another, such as being disposed on opposite ends of the top piece 110C of the support bracket 110. For example, the second support arm 110B may be disposed at a distance from the first support arm 110A such that the first and second swing arms 120A and 120B and the caster wheel 130 are disposed between the first and second support arms 110A and 110B. In this example, and as shown, the spacing of the second support arm 110B from the first support arm 110A depends on the mating structure that may be disposed between the first and second support arms 110A and 110B. Although the first and second support arms 110A and 110B are described, in other embodiments more or less than two support arms may be used. For example, the adjustable wheel assembly 100 may use only one support arm.

In the exploded view, the first and second support arms 110A and 110B are shown to define a plurality of apertures, such as apertures 112A and 112B on the first support arm 110A. The second support arm 110B may have apertures that mirror the apertures on the first support arm 110A. Although two apertures, 112A and 112B, are shown on the first support arm 110A, in other embodiments more or less than two apertures may be used. For example, the first and second support arms 110A and 110B may each have one aperture, two apertures, three apertures, etc. In some examples, at least one aperture on the first and second support arms 110A and 110B is a point of rotation and at least one aperture is configured to receive the bolt 104. In the example shown, aperture 112B is the point of rotation on the first support arm 110A. A corresponding aperture to 112B, forming the point of rotation, and mirroring the position of aperture 112B, may be found on the second support arm 110B. However, in other examples a different aperture may form the point of rotation.

In one example, the fastener 106 pivotally couples the first and second swing arms 120A and 120B to the first and second support arms 110A and 110B at the point of rotation, and the aperture configured to receive the bolt 104 is distinct from the point of rotation. In this example, the bolt 104, may be an eccentric bolt or a cam bolt.

The first and second swing arms 120A and 120B may rotate and/or pivot about the point of rotation as the adjustable wheel assembly 100 is being adjusted. Aperture 112A may be configured to receive the bolt, such as bolt 104. In one example, the bolt 104 is movable between a first position and a second position. The aperture 112A may, therefore, define a path of travel for the bolt as it moves between the first and second position. However, in some instances, the aperture 112A may not define the path of travel and may be another shape such as circular, oval, or oblong. In some examples, aperture shape and dimensions allow coupling with the bolt. Further, in other examples, the aperture configured to receive the bolt 104 may also form the point of rotation, thus the point of rotation may be formed independent of the aperture configured to receive the bolt 104.

In one example, the bolt 104, movable between the first position and the second position, couples the first support arm 110A to the first swing arm 120A and couples the second support arm 110B to the second swing arm 120B.

The first and second swing arms 120A and 120B are additionally shown in the example of FIG. 3. The first and second swing arms 120A and 120B are shown as a single piece, with the second swing arm 120B being disposed at a distance from the first swing arm 120A. The caster wheel 130 may be disposed between, and couple to, the first and second swing arms 120A and 120B. Therefore, the distance at which the first swing arm 120A is disposed from the second swing arm 120B may be dependent on the dimensions (e.g., a width) of the caster wheel 130. In further examples, the first and second swing arms 120A and 120B are disposed within, and couple to, the support bracket 110 between the first and second support arms 110A and 110B. Thus, the distance at which the first and second swing arms 120A and 120B are disposed from one another may be dependent on the dimensions (e.g., a width) of the first and second support arms 110A and 110B disposed from one another on the support bracket 110.

While the first and second swing arms 120A and 120B are shown in FIG. 3 as being included on a single piece, in other examples the first swing arm 120A may be a separate piece from the second swing arm 120B. In further examples, only a single swing arm may be used. In this way, any number of swing arms may be used in adjustable wheel assemblies described herein. The swing arms may form a single piece or be distinct pieces.

Further, the first and second swing arms 120A and 120B are shown to define a plurality of apertures, such as apertures 122A-C on the first swing arm 120A. The first swing arm 120A may have a first end which may define apertures, such as apertures 122A and 122B, and a second end which may define apertures, such as aperture 122C. The second swing arm 120B may be symmetric to the first swing arm 120A, and the apertures on the second swing arm 120B may similarly mirror, or align with, those on the first swing arm 120A. Thus, the example features described with respect to the first swing arm 120A may be the same for the second swing arm 120B.

Each of the apertures may be configured to receive a bolt, such as bolt 104 and/or fasteners 106. In one example, the first swing arm 120A defines the first end, the second end, and the plurality of apertures, where the first end receives the bolt 104 in at least one of the apertures and is pivotally coupled to the first support arm 110A. The second end of the first swing arm 120A is rotatably coupled to the caster wheel 130. The first swing arm 120A is be vertically movable between a raised position and a lowered position relative to the underside of the second side of the housing (as shown in FIG. 1). The caster wheel 130 and the first swing arm 120A are in the raised position when the bolt 104 is in the first position and the caster wheel 130 and the first swing arm 120A are in the lowered position when the bolt 104 is in the second position.

The apertures 122A-C, and similarly those on the second swing arm 120B, may also be configured to receive a bushing. In some examples, a bushing 124 is housed within the aperture 122A and is disposed between the first and second swing arms 120A and 120B. The bushing 124 may aid in load transfer, such as bearing load, throughout the parts when the adjustable wheel assembly 100 is mounted to the tool storage unit 10. The bushing 124 may include radially disposed bearings, such as ball bearings, roller bearings, or needle bearings, to further assist in movement of the adjustable wheel assembly 100 as the bolt 104 moves from the first position to the second position. The aperture 122B may also receive a bushing, which may couple to, and be disposed between, the first and second swing arms 120A and 120B. Similarly, the aperture 122C may be configured to receive the bushing in addition to the bolt 104 and/or fastener 106. Thus, the shape and dimensions of the apertures on the first and second swing arms 120A and 120B may be determined, at least partially, by the coupling fastener and/or bolt and/or bushing.

In one example, the aperture 112A on the first support arm 110A couples to the aperture 122A on the first swing arm 120A. Similarly, the aperture 112B on the first support arm 110A couples to the aperture 122B on the first swing arm 120A. As previously stated, the apertures on the second support arm 110B may mirror the apertures on the first support arm 110A, and the apertures on the second swing arm 120B may mirror the apertures on the first swing arm 120A. Thus, similarly situated apertures present on the second support arm 110B may couple to the apertures on the second swing arm 120B. Coupling between the respective parts may be accomplished using the bolt 104 and/or fasteners 106 at the respective apertures.

The caster wheel 130 may be coupled, by way of either the bolt 104 or fasteners 106, to the first and second swing arms 120A and 120B through at least one aperture located on the respective swing arms, such as aperture 122C located on the second end. In one example, the bolt 104 is used to couple the swing arms to the caster wheel 130. The bolt 104 may be the eccentric bolt or the cam bolt. The bolt 104 may be used to adjust the position of the caster wheel 130 from a first position to a second position, such as from an extended position to an unextended position. Changing the caster wheel 130 from the first position to the second position may allow the height of the tool storage unit 10 to be adjusted by adjusting the caster wheel 130 position relative to the position of the swing arms 120A and 120B. In another example, the swing arms 120A and 120B are coupled to the support bracket 110 using at least one bolt 104, and the caster wheel 130 is coupled to the swing arms 120A and 120B using at least one bolt 104. In this example, both of the bolts 104 may be movable between a first position and a second position, and allow multiple points of adjustment on the caster wheel assembly 100. For example, the caster wheel 130 and swing arms 120A and 120B may be movable between a first position and a second position, such as an extended position and an unextended position, relative to the support bracket 110 through adjustment of the bolt 104 coupling the support bracket 110 to the swing arms 120A and 120B. Similarly, the caster wheel 130 may additionally be movable between a first position and a second position, such as an extended position and an unextended position, relative to the swing arms 120A and 120B and the support bracket 110 through adjustment of the bolt 104 coupling the caster wheel 130 to the swing arms 120A and 120B. Thus, multiple points of adjustment from the first position to the second position are possible on the adjustable wheel assembly 100. Multiple points of adjustment may allow for the tool storage unit 10 to be adjusted to a level position while resting on an unlevel, graded, or sloped surface. Such adjustment to the level position may reduce the tool storage unit 10 from uncontrolled rolling without the aid of chocks, and/or mitigate unintentional sliding open of drawers. Further, on unlevel surfaces, drawers on the tool storage unit 10 may have forces pressing on a locking feature, which may not allow the locking feature to properly engage. Thus, adjustment of the tool storage unit 10 to the level position may allow locks on drawers to properly engage by mitigating forces exerted by the drawer on the locking feature.

The example bolt 104 shown in FIG. 3 includes an eccentric fastener 104A and eccentric cams 104B which couple to the eccentric fastener 104A. The eccentric cams 104B slide onto the eccentric fastener 104A and are located on an outside surface of the first and second swing arms 110A and 110B. A securing member 108 (e.g., a nut or pin) further couples to the bolt 104 to secure the pieces together. Securing members 108 may additionally be coupled to the fasteners 106. The eccentric cams 104B have an off-center aperture that the eccentric fastener 104A is coupled to. As such, the position of the bolt 104, in this example the bolt 104 includes the eccentric cams 104B coupled with the eccentric fastener 104A, relative to a location on the support bracket 110 may be adjusted as the eccentric cam 104B is rotated. Thus, the eccentric cams 104B, may therefore allow for adjustment from the first position to the second position of the bolt 104 when residing in an aperture, such as the aperture 112A.

In one example, the bolt 104 is a cam bolt. In another example, the bolt 104 is an eccentric bolt. The bolt 104 may be employed in multiple apertures or a single aperture on any of the parts of the adjustable wheel assembly 100. The eccentric nature of the bolt 104 may allow for adjustment of the adjustable wheel assembly 100 as the bolt 104 is rotated from the first position to the second position causing movement in at least one of the parts coupled by the bolt 104. For example, rotation of the bolt 104 from the first position to the second position may cause movement, such as from the extended position to the unextended position, of the swing arms 120A and 120B when the bolt 104 is used to couple the first and second swing arms 120A and 120B to the first and second support arms 110A and 110B of the support bracket 110. The coupling may be accomplished through at least aperture 112A and aperture 122A. Other locations of the bolt 104 are also contemplated, as previously stated.

While the bolt 104 in the example of FIG. 3 includes the eccentric bolt and eccentric cams 104A as separate pieces, in other examples the bolt 104 may be a single piece or includes an integrally formed eccentric cam or eccentric member. Additional examples of the bolt 104, are discussed below with respect to FIGS. 7A and 7B.

Figure 4A:
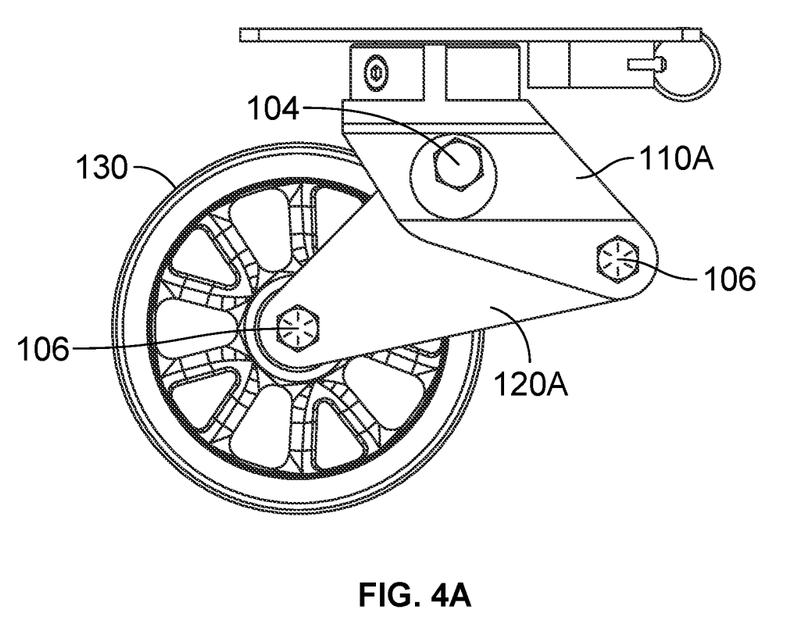
FIG. 4A illustrates a side view of the adjustable wheel assembly, according to an example embodiment.
Figure 4B:
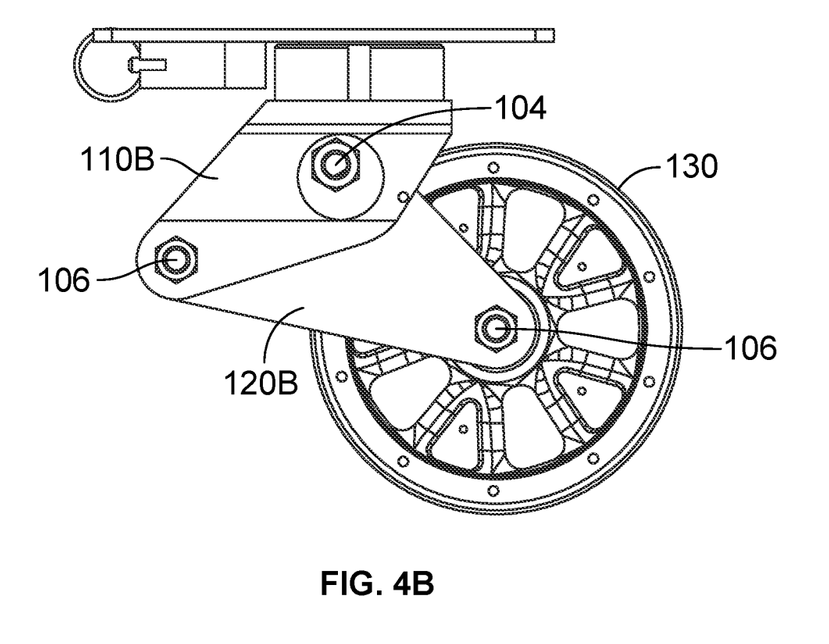
FIG. 4B illustrates a side view of the adjustable wheel assembly, according to an example embodiment.

FIGS. 4A and 4B illustrate side views of the adjustable wheel assembly 100, according to an example embodiment. The example adjustable wheel assembly 100 illustrates the bolt 104 coupling the support bracket 110 to a first end of the first and second swing arms 120A and 120B which are further coupled at a second end to the caster wheel 130 by way of the fastener 106. The support bracket 110 is further coupled to the first and second swing arms 120A and 120B using the fastener 106, which defines the point of rotation. Adjustment of the bolt 104 from the first position to the second position, causes the first and second swing arms to move from the extended position to the unextended position, rotating about the point of rotation. Thus, the position of the caster wheel 130 may be adjusted by adjusting the position of the bolt 104.

Figure 5A:
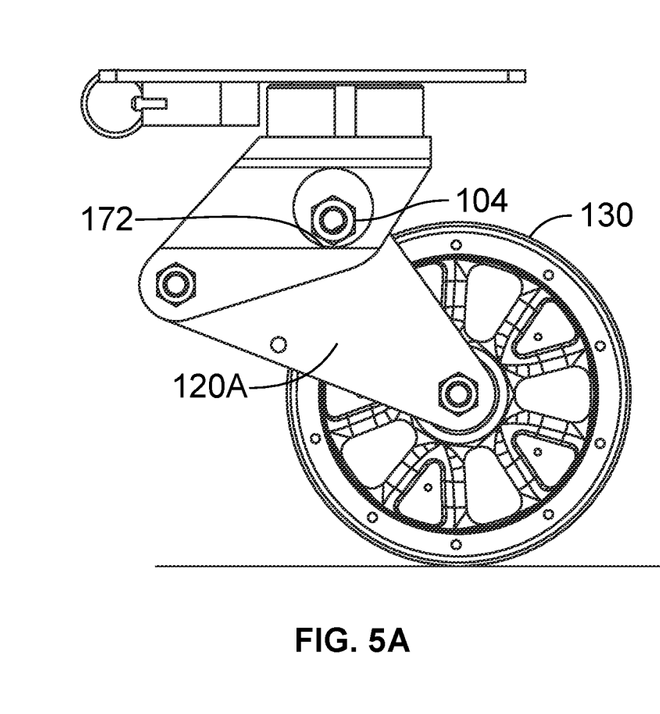
FIG. 5A illustrates a side view of the adjustable wheel assembly where the bolt is in the first position, according to an example embodiment.
Figure 5B:
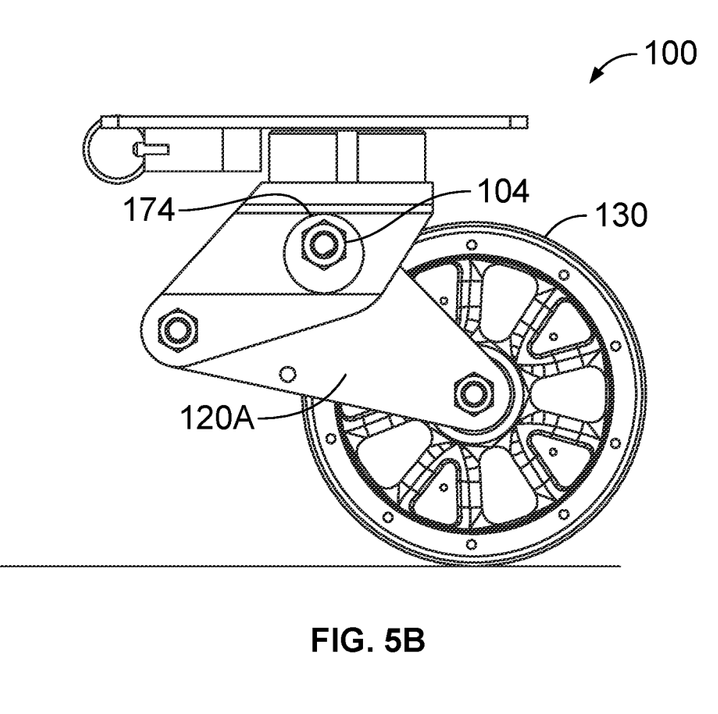
FIG. 5B illustrates a side view of the adjustable wheel assembly where the bolt is in the second position, according to an example embodiment.
Figure 5C:
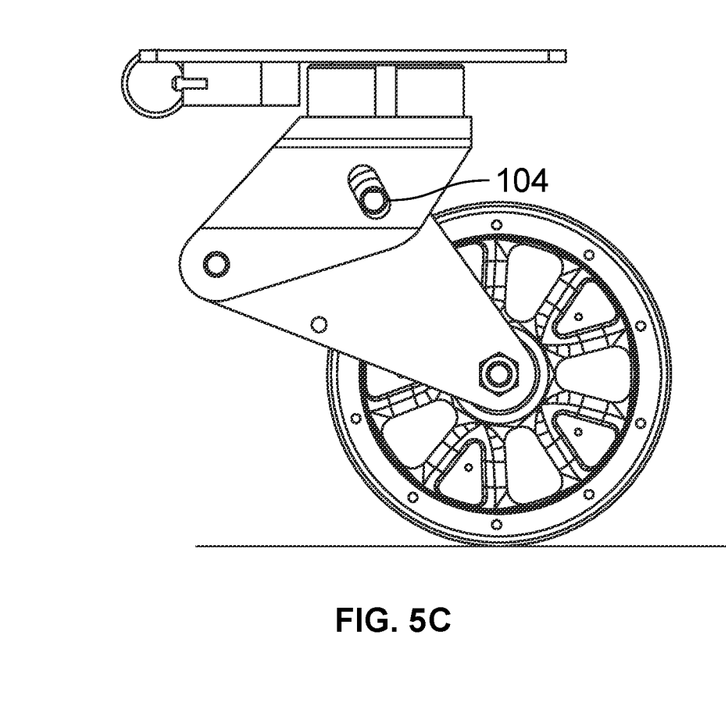
FIG. 5C illustrates a side view of the adjustable wheel assembly where the bolt is in the first position, according to an example embodiment.
Figure 5D:
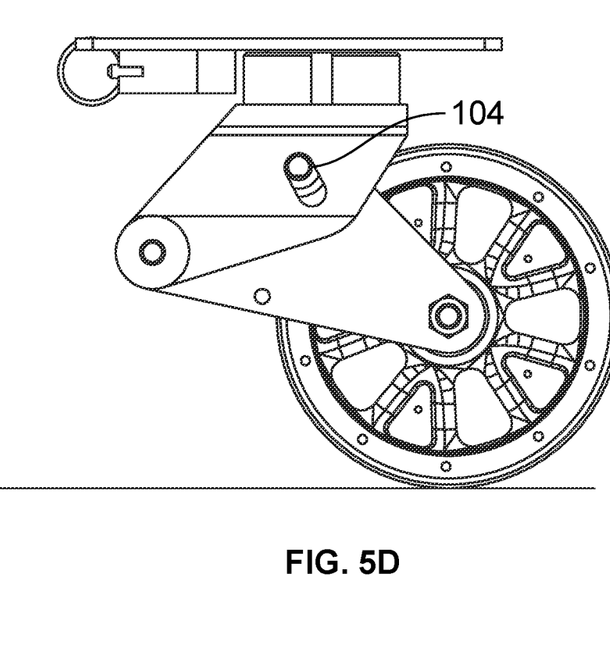
FIG. 5D illustrates a side view of the adjustable wheel assembly where the bolt is in the second position, according to an example embodiment.

FIGS. 5A-5D show side views of the adjustable wheel assembly 100 where the bolt 104 is in the first position and the second position, according to an example embodiment. FIGS. 5A and 5C illustrate side views of the adjustable wheel assembly 100 when the bolt 104 is in the first position 172, while FIGS. 5B and 5D illustrate side views of the adjustable wheel assembly 100 when the bolt 104 is in the second position 174.

In the examples shown, when the bolt 104 is in the first position 172, the first swing arm 120A and/or caster wheel 130 are in the extended position. The extended position may be relative to another surface and/or part that is not adjusted (e.g., remains stationary). For example, the first swing arm 120A and/or caster wheel 130 may be in the extended position relative to the underside of the second side 14 of the tool storage unit 10 and/or relative to the first support arm 110A of the support bracket 110. In the extended position, for instance when the bolt is in the first position 172, the first swing arm 120A and the caster wheel 130 may be disposed at a distance further away from the underside of the second side 14 of the tool storage unit 10 than in the unextended position, for instance when the bolt 104 is in the second position 174.

The position of the bolt 104 may be changed from the first position 172 to the second position 174 by loosening of the securing member 108 (shown in FIG. 3) and rotating the bolt 104 from one position to the other position. In this example, the bolt 104 is coupled to the first swing arm 120A; thus, rotation of the bolt 104 from the first position 172 to the second position 174 causes movement in the first swing arm 120A, such as from the extended position to the unextended position. After the bolt 104 has been moved to the new position (e.g., the second position 174) the securing member 108 may be tightened to hold the bolt 104 in place using clamp up loads exerted by the securing member 108. Thus, adjustment of the adjustable wheel assembly 100 may be accomplished by moving the position of the bolt 104. Such adjustments may allow objects that the adjustable wheel assembly 100 coupled to, such as the tool storage unit 10, to maintain a level orientation when situated on an uneven surface. This may reduce the occurrence of such objects from uncontrolled rolling which would otherwise pose a safety hazard to personnel.

FIG. 5C is a side cutaway view showing the position of the bolt 104 in the aperture receiving the bolt 104 when the bolt 104 is in the first position 172. FIG. 5D is a side cutaway view showing the position of the bolt 104 in the aperture receiving the bolt when the bolt 104 is in the second position 174. As shown, the aperture receiving the bolt 104 may define a path of travel of the bolt 104 as the bolt 104 moves from the first position 172 to the second position 174.

While the examples shown in FIGS. 5A-5D show the adjustable wheel assembly 100 employing only one bolt 104, in other examples the adjustable wheel assembly may include more than one bolt 104. For example, a second bolt 104 may be included and couple the first swing arm 120A to the caster wheel 130.

Figure 6:
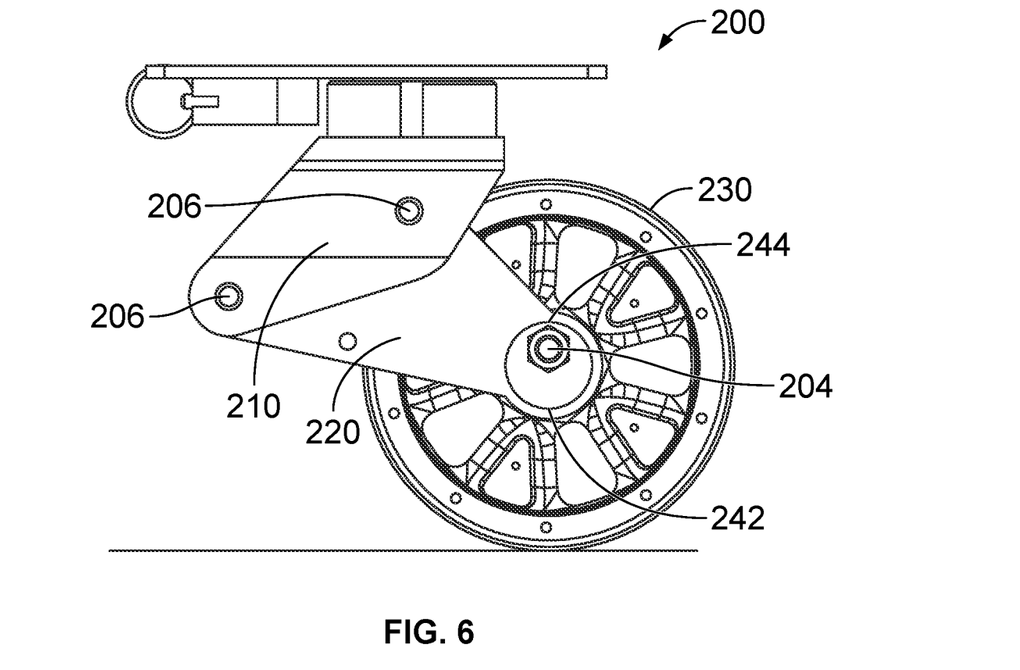
FIG. 6 illustrates an adjustable wheel assembly, according to an example embodiment.

In some examples, an adjustable wheel assembly may allow for adjustment to occur at the caster wheel. FIG. 6 shows an adjustable wheel assembly 200, according to an example embodiment. The adjustable wheel assembly 200 includes a support arm 210 coupled, by way of fasteners located at apertures 206, to a swing arm 220 which is rotatably coupled, using an adjustable bolt 204, to a caster wheel 230. In some examples, such as the example shown, the fasteners located at apertures 206 fixedly connect the swing arm 220 to the support arm 210. However, the adjustable bolt 204 may also be used in the apertures 206 to couple the swing arm 220 to the support arm 210.

The adjustable wheel assembly 200 may be of similar construction and have similar parts as described with respect to the adjustable wheel assembly 100. Therefore, features and components described in the sections discussing the adjustable wheel assembly 100 are applicable with respect to the adjustable wheel assembly 200.

In some examples, the adjustable wheel assembly 200 is coupled to an object, such as the tool storage unit 10. In this example, the caster wheel 230 is vertically movable between a raised position and a lowered position relative to the underside of the second side 14 of the tool storage unit 10. The caster wheel 230 is in the raised position when the adjustable bolt 204 is in the first position 242, and in the lowered position when the adjustable bolt 204 is in the second position 244. Thus, movement of the adjustable bolt 204 from the first position 242 to the second position 244 causes the caster wheel 230 to move from the raised position to the lowered position relative to the underside 14 of the second side of the tool storage unit 10. The adjustable wheel assembly 200 may allow for leveling of the tool storage unit 10 on uneven surfaces, thus reducing a likelihood of uncontrolled rolling, without the aid of chocks. Eliminating the need for chocks may allow fluids on the uneven surface to properly drain, providing for a more hygienic and safer work environment.

Figure 7A:
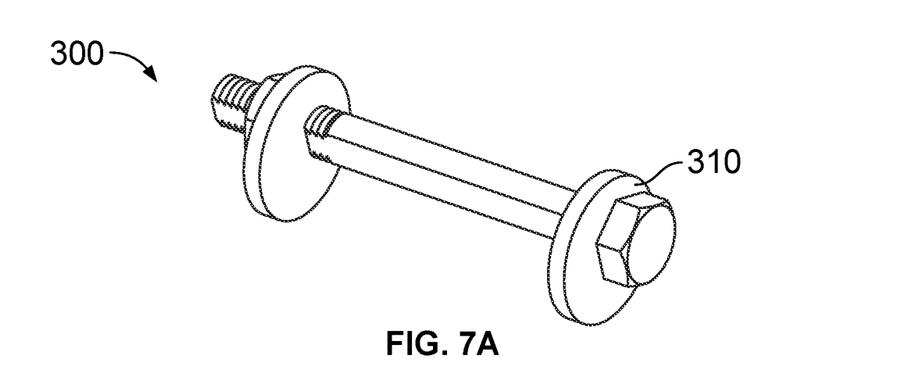
FIGS. 7A and 7B illustrate example bolts that may be used on an adjustable wheel assembly, according to an example embodiment.
Figure 7B:
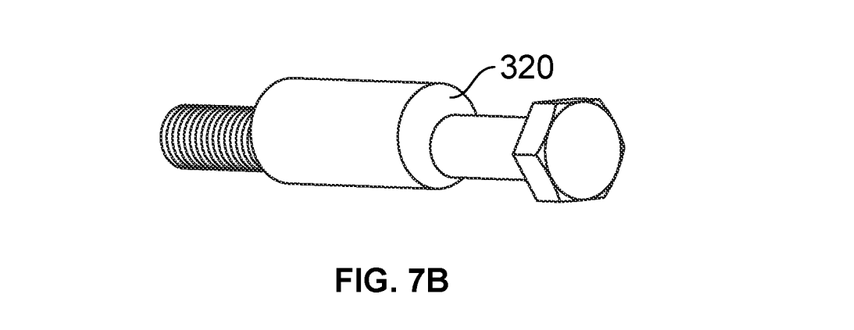

FIGS. 7A and 7B show example bolts 300 that may be used on the adjustable wheel assembly 100, according to an example embodiment. FIG. 7A illustrates an eccentric bolt 310 and FIG. 7B illustrates a cam bolt 320 according to an example.

In some examples, the bolt 104 may take the form of the eccentric bolt 310, while in other examples the bolt 104 may take the form of the cam bolt 320. In examples where the adjustable wheel assembly includes more than one bolt 104, multiple eccentric bolts 310 may be used, multiple cam bolts 320 may be used, or a mix of eccentric bolts 310 and cam bolts 320 may be used. The use of the eccentric bolt 310 and/or cam bolt 320 may allow linear motion (e.g., raising and lowering) of the adjustable wheel assembly 100 as the bolt is moved (e.g., rotated) from the first position 172 to the second position 174, as described above and illustrated in FIGS. 5A-5D.

The dimensions of the eccentric bolt 310 and/or cam bolt 320 may be chosen based on the design constraints of the adjustable wheel assembly 100, for example. Additionally and/or alternatively, the design of the adjustable wheel assembly 100, for example the shape and/or dimensions of the apertures, may be selected based on the eccentric bolt 310 and/or cam bolt 320 chosen.

The eccentric bolt 310 and/or cam bolt 320 may be formed from a single piece, or may include multiple components assembled together. A securing member, such as a nut, may couple to the eccentric bolt 310 and/or the cam bolt 320, and may serve to provide clamp up load during use.

The eccentric bolt 310 and/or cam bolt 320 may be made from any suitable material. In one example, the eccentric bolt 310 and/or cam bolt 320 is made from steel; however, other metals may also be used. A coating or treatment may also be applied to the eccentric bolt 310 and/or the cam bolt 320. The coating or treatment may be a corrosion or erosion preventative coating, for example galvanizing; however, other coatings or treatments are also contemplated.

Figure 8:
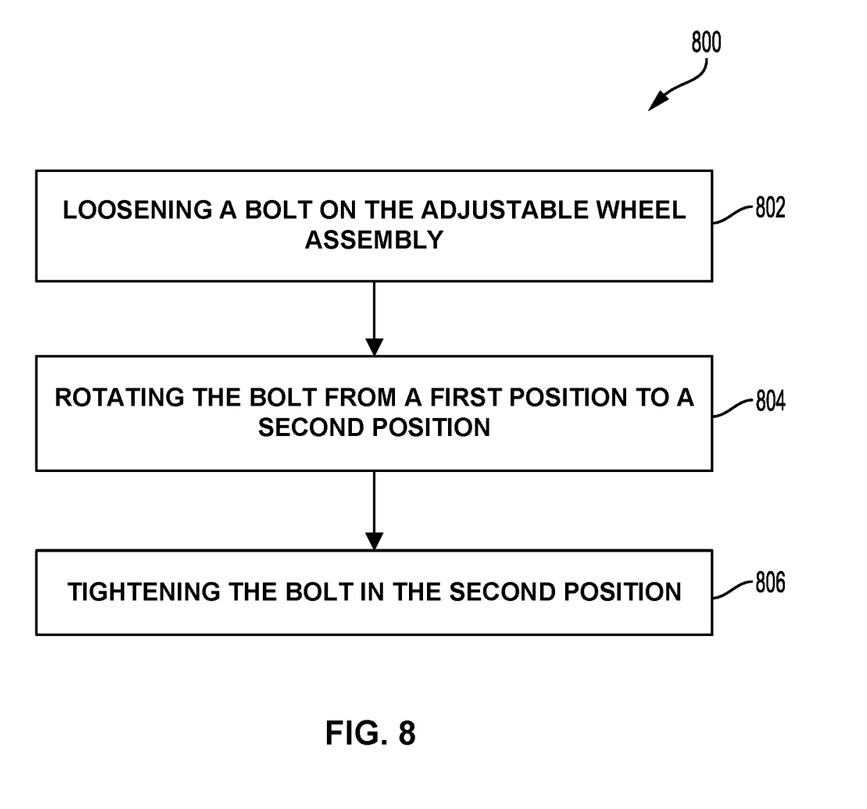
FIG. 8 illustrates a method of adjusting the height of a tool storage unit having an adjustable wheel assembly, according to an example embodiment.

FIG. 8 shows a method 800 of adjusting the height of a tool storage unit having an adjustable wheel assembly, according to an example embodiment.

At block 802 the method 800 includes loosening a bolt on the adjustable wheel assembly, where the bolt is in a first position and movable between the first position and a second position, and where the adjustable wheel assembly is in a raised position when the bolt is in the first position.

In some examples, loosening the bolt may involve loosening a nut securing the bolt. However, in other examples a cam lever or other clamping device may be coupled to the bolt and loosened.

At block 804 the method 800 includes rotating the bolt from the first position to the second position, wherein the adjustable wheel assembly is in a lowered position when the bolt is in the second position.

At block 806 the method 800 includes tightening the bolt in the second position via a clamp up load.

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a device.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. A tool storage unit comprising:
   a housing configured to store a tool, the housing having both a first side and a second side opposite the first side, the second side defining an underside; and
   an adjustable wheel assembly coupled to the housing, the adjustable wheel assembly comprising:
      a bolt movable between a first position and a second position within the adjustable wheel assembly,
      a support arm, connected to the underside of the second side of the housing, extending outwardly from the housing and defining a plurality of apertures, wherein at least one of the plurality of apertures is a point of rotation and at least one of the plurality of apertures is configured to receive the bolt,
      a caster wheel, and
      a swing arm vertically movable between a raised position and a lowered position relative to the underside of the second side, the swing arm having a first end pivotally coupled to the support arm at the point of rotation and a second end rotatably coupled to the caster wheel, wherein the bolt couples the first end to the support arm at the aperture configured to receive the bolt, and wherein the caster wheel and swing arm are rotated about the point of rotation to the raised position when the bolt is moved to the first position and the caster wheel and swing arm are in the lowered position when the bolt is moved to the second position.

2. The tool storage unit of claim 1, further comprising a non-adjustable wheel assembly coupled to the housing.

3. The tool storage unit of claim 1, wherein the bolt is an eccentric bolt.

4. The tool storage unit of claim 1, wherein the bolt is a cam bolt.

5. The tool storage unit of claim 1, wherein a fixed bolt pivotally couples the swing arm to the support arm at a second point of rotation, and the aperture configured to receive the bolt is distinct from the second point of rotation of the fixed bolt.

6. The tool storage unit of claim 5, wherein the bolt is an eccentric bolt or a cam bolt.

7. The tool storage unit of claim 1, wherein an eccentric bolt or a cam bolt rotatably couples the second end of the swing arm to the caster wheel.

8. The tool storage unit of claim 1, wherein the support arm is a first support arm and the adjustable wheel assembly further comprises:
   a second support arm symmetrical to the first support arm and disposed at a distance from the first support arm such that the swing arm and the caster wheel are disposed between the first and second support arms.

9. The tool storage unit of claim 8, wherein the swing arm is a first swing arm coupled to the first support arm and the adjustable wheel assembly further comprises:
   a second swing arm symmetrical to the first swing arm and coupled to the second support arm, wherein the caster wheel is disposed between and rotatably coupled to the first and second swing arm.

10. An adjustable wheel assembly comprising:
    a bolt movable between a first position and a second position within the adjustable wheel assembly,
    a support bracket comprising a support arm that defines a plurality of apertures, wherein at least one of the plurality of apertures is a point of rotation and at least one of the plurality of apertures is configured to receive the bolt,
    a caster wheel, and
    a swing arm vertically movable between an extended position and an unextended position relative to the support bracket, the swing arm having a first end pivotally coupled to the support arm at the point of rotation and a second end rotatably coupled to the caster wheel, wherein the bolt couples the first end to the support arm at the aperture configured to receive the bolt, and wherein the caster wheel and swing arm are rotated about the point of rotation to the extended position when the bolt is moved to the first position and the caster wheel and swing arm are in the unextended position when the bolt is moved to the second position.

11. The adjustable wheel assembly of claim 10, wherein the bolt is an eccentric bolt.

12. The adjustable wheel assembly of claim 11, wherein the eccentric bolt comprises an eccentric fastener coupled to at least one eccentric cam.

13. The adjustable wheel assembly of claim 10, wherein the bolt is a cam bolt.

14. The adjustable wheel assembly of claim 10, wherein a fixed bolt pivotally couples the swing arm to the support arm at a second point of rotation, and the aperture configured to receive the bolt is distinct from the second point of rotation of the fixed bolt.

15. The adjustable wheel assembly of claim 14, wherein the bolt is an eccentric bolt or a cam bolt.

16. The adjustable wheel assembly of claim 10, wherein an eccentric bolt or a cam bolt rotatably couples the second end of the swing arm to the caster wheel.

17. The adjustable wheel assembly of claim 10, wherein the support arm is a first support arm and the support bracket further comprises:

a second support arm symmetrical to the first support arm and disposed at a distance from the first support arm such that the swing arm and the caster wheel are disposed between the first and second support arms.

18. The adjustable wheel assembly of claim 17, wherein the swing arm is a first swing arm coupled to the first support arm and the adjustable wheel assembly further comprises:

a second swing arm symmetrical to the first swing arm and coupled to the second support arm, wherein the caster wheel is disposed between and rotatably coupled to the first and second swing arm.

19. A method of adjusting the height of a tool storage unit having an adjustable wheel assembly comprising a support arm, a caster wheel, and a swing arm vertically movable between a raised position and a lowered position relative to an underside of the tool storage unit, wherein the swing arm has a first end pivotally coupled to the support arm and a second end rotatably coupled to the caster wheel, and wherein a bolt couples the first end to the support arm; the method comprising:

loosening the bolt on the adjustable wheel assembly, wherein the bolt is in a first position and movable between the first position and a second position within the adjustable wheel assembly, and wherein the adjustable wheel assembly is in a raised position when the bolt is in the first position;

rotating the bolt from the first position to the second position, wherein the adjustable wheel assembly is in a lowered position when the bolt is in the second position; and tightening the bolt in the second position via a clamp up load.

* * * * *